United States Patent
Wang

(10) Patent No.: US 6,366,325 B1
(45) Date of Patent: Apr. 2, 2002

(54) SINGLE PORT VIDEO CAPTURE CIRCUIT AND METHOD

(75) Inventor: Chun Wang, North York (CA)

(73) Assignee: ATI International SRL, Christ Church (BB)

( * ) Notice: Subject to any disclaimer, the term of this patent is extended or adjusted under 35 U.S.C. 154(b) by 0 days.

(21) Appl. No.: 09/206,679

(22) Filed: Dec. 7, 1998

(51) Int. Cl.$^7$ ................................................ H04N 7/00
(52) U.S. Cl. ........................ 348/465; 348/476; 348/478
(58) Field of Search ............................... 348/476, 477, 348/478, 482, 484, 468, 465, 462, 464, 552; 386/95, 46, 83

(56) References Cited

U.S. PATENT DOCUMENTS

| | | | | |
|---|---|---|---|---|
| 4,910,670 A | * | 3/1990 | Smith et al. ................. | 348/552 |
| 5,218,450 A | * | 6/1993 | Nagai et al. .................. | 386/95 |
| 5,579,055 A | * | 11/1996 | Hamilton et al. ........... | 348/476 |
| 5,699,124 A | * | 12/1997 | Nuber et al. ................. | 348/465 |
| 5,940,070 A | * | 8/1999 | Koo ............................ | 348/482 |
| 5,844,615 A | * | 11/1999 | Nuber et al. ................. | 348/478 |
| 5,982,459 A | * | 11/1999 | Fandrianto et al. ......... | 348/554 |
| 6,157,411 A | * | 12/2000 | Williams et al. ............ | 348/552 |

* cited by examiner

Primary Examiner—Michael Lee
Assistant Examiner—Trang U. Tran
(74) Attorney, Agent, or Firm—Vedder, Price, Kaufman & Kammholz

(57) ABSTRACT

A system and method employs a single port digital video and/or audio capture circuit that is responsive to digitized uncompressed digital video and/or audio data and vertical blanking interval (VBI) data. In one embodiment, the single port capture circuit employs a parsing circuit that parses received VBI data along with any other received data such as video data and/or audio data and serves as a memory control signal generator that generates a VBI memory control signal and at least one of a video memory control signal and/or audio memory control signal to facilitate storage of the parsed VBI data, video data and audio data (if present) into predefined distinct locations within a memory, such as a frame buffer. A write FIFO memory receives the video data, VBI data, video memory address data and VBI memory address data (and audio information if present) as a storage hold prior to being stored in the frame buffer.

15 Claims, 3 Drawing Sheets

SINGLE PORT VIDEO CAPTURE CIRCUIT AND METHOD

FIELD OF THE INVENTION

The invention relates generally to video capture circuits and methods, and more particularly to digital video and/or audio capture circuits and methods that captures data embedded in vertical blanking intervals, such as close-caption data, ancillary data or other data.

BACKGROUND OF THE INVENTION

Graphics adapters, sometimes referred to as graphics controllers, are known which enhance the performance of display systems such as laptop computers, desktop computers, portable computing units and other devices. Graphics controller chips are increasingly employed to accommodate digital video from DVD sources, cable television, and other video sources wherein the video is displayed along with graphics information on a computer screen. In a multimedia system this may allow users to both watch movies, and perform other computer functions simultaneously.

Video signals such as NTSC format signals utilize vertical blanking regions (e.g. vertical blanking intervals) to contain non-active video data such as closed-caption data and other data as known in the art. Graphics controller chips are known that have video capture circuits to suitably capture video data received through an analog or digital video decoder. Video decoders are known that generate ancillary data blocks (ANC) which may include for example audio data or other data. The ancillary data is typically included in the vertical blanking interval. Once the video and ancillary information is obtained, a host processor typically analyzes the vertical blanking interval data and ancillary data to determine what the data is and then subsequently presents the data properly on a display device.

Video decoders are known that partially decode vertical blanking interval data and insert the encoded vertical blanking information into the horizontal blank regions in the form of ancillary data so that the host processor need not do as much decoding and processing, thereby improving the performance of the system. This may become particularly important where multi-tasking is required by the host processor.

Also known are single port video chips, separate single port audio chips and single port VBI chips. A problem can arise with separate single port digital video and audio capture circuits since such circuits have to accommodate separate types of data such as video data, audio data, and other digital data, such as ancillary data embedded as part of a vertical blanking interval. Each type of data typically needs to be captured and routed to a proper processing engine or display unit in an efficient manner, otherwise the loss of data can occur. For example, where the video data may be a live feed, any loss of information will result in an unacceptable display quality due to missing data.

Also, if systems use separate decoders for audio data and/or ancillary data, it may be possible to pass the decoded audio directly to a speaker to guarantee that the information is not lost. However, such information may not necessarily be in synchronization with received video. Although such a system may not require writing of audio information to a frame buffer or other storage device, it may risk nonsynchronization of audio and video during display. Hence, storage of some data may be present.

Multiport capture circuits can sometimes afford improved performance by allowing different ports to receive and process different types of data. However, such multiport capture circuit can require additional circuitry that adds cost and size to an integrated circuit.

Consequently, there exists a need for a single port digital video and/or audio capture circuit that accommodates the processing of vertical blanking interval data, such as closed-caption data, audio data, or any other suitable data. It would be desirable if such a single port capture circuit and method would be employed in a graphics chip that could interface with a host processing unit to help reduce the loading on the host processor.

DETAILED DESCRIPTION OF A PREFERRED EMBODIMENT OF THE INVENTION

Briefly, a system and method employs a single port digital/video and or audio capture circuit that is responsive to digitized uncompressed digital video and/or audio data and vertical blanking interval (VBI) data. Audio data is a type of ancillary data (ANC) usually transmitted during horizontal blanking intervals. In one embodiment, the single port capture circuit employs a parsing circuit that parses received VBI data along with any other received data such as video data and/or audio data and serves as a memory control signal generator that generates a VBI memory control signal and at least one of a video memory control signal and/or audio memory control signal to facilitate storage of the parsed VBI data, video data and audio data (if present) into predefined distinct locations within a memory, such as a frame buffer. A write FIFO memory receives the video data, VBI data, video memory address data and VBI memory address data (and audio information if present) as a storage hold prior to being stored in the frame buffer. A memory controller receives the data stored in the write FIFO and stores the information in the frame buffer accordingly.

Figure 1:
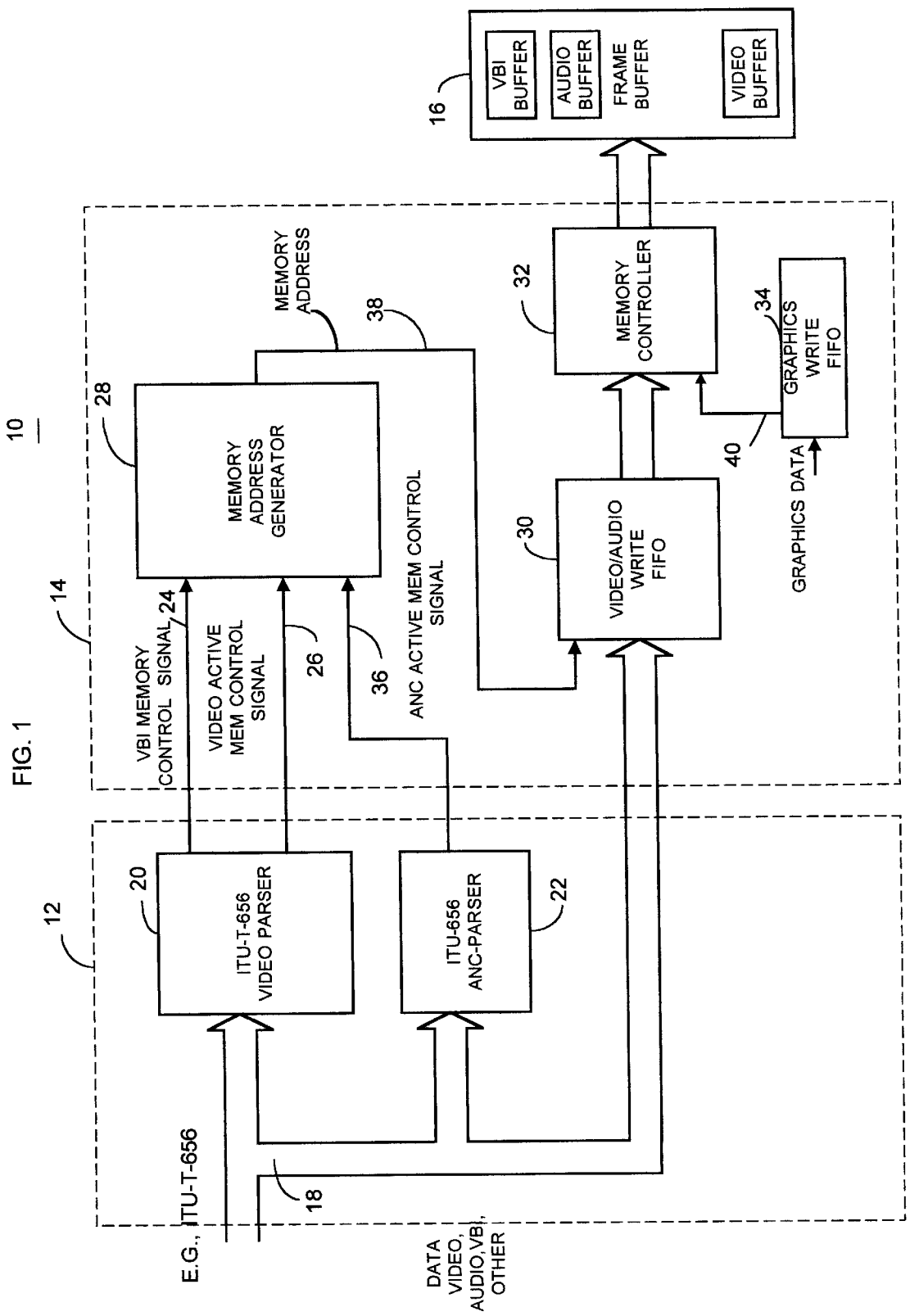
FIG. 1 is a block diagram illustrating one embodiment of a single port digital, video and/or audio capture circuit in accordance with one embodiment of the invention.

FIG. 1 shows a single port digital video capture circuit 10 on a single chip having a parsing circuit 12 and a memory control signal generating circuit 14. The memory control signal generating circuit 14 outputs selected data to a frame buffer 16 to facilitate the requisite processing and/or display of video data. The single port capture circuit 10 receives digitized uncompressed digital video data and/or audio and vertical blanking interval data 18 from a suitable video decoder, such as an MPEG decoder, analog video decoder with comb filtering or any other suitable video decoder that may suitably accommodate ancillary data in the horizontal (or vertical) blanking interval.

The parsing circuit 12 may include a single parsing circuit that receives VBI data and video data (and audio data if present) or if desired may include a separate parser 20, for video data and a separate parser 22 for ancillary data that is embedded in a horizontal blanking interval or other interval in a video source signal. The video parser 20 determines which data is video based on tag, for example, data in the uncompressed decoded stream 18. The data 18 may be in any suitable format including for example ITU-T-656 format as known in the art. In this example the video parser 20 and ancillary data parser 22 also parse data received in ITU-T-656 format. The video parser 20 parses the digital video signal to determine what portion of the video signal is the vertical blanking interval and the horizontal blanking interval and which portion is active video. The video parser 20 outputs a vertical blanking interval memory control signal 24 and a video active memory control signal 26. The horizontal blanking interval is the inverse of the video active memory control signal 26. This information is provided to the memory control signal generating circuit 14. The memory control signal generating circuit 14 includes a memory address generator 28, a video and/or audio write FIFO 30, a memory controller 32 and a graphics write FIFO 34.

The video parser 20 generates the VBI memory control signal and the video active memory control signal 26 for use by the memory address generator 28. The auxiliary data parser 22 also receives the uncompressed digital stream 18 and analyzes the data for auxiliary data which occur in a vertical blanking interval and/or a horizontal blanking interval for example. It may also occur for example at the end of active image data or other suitable portion of the video signal if desired. The auxiliary data parser 22 upon detecting auxiliary data in the video signal, generates an auxiliary (ANC) active memory control signal 36 for the memory address generator 28. The data includes, for example, an ANC header that indicates which data is auxiliary data, the type of data (audio etc.) and the size of the data block. From this information, the parser generates the active memory control signal to store the ANC data at a specified location.

The memory address generator is operatively responsive to the memory control signals 24, 26 and 36. The memory address generator 28 generates a separate memory address for detected VBI data based on the VBI memory control signal 24. In addition, the memory address generator 28 generates a separate memory address for video data based on the video active memory control signal 26. Also, the memory address generator 28 generates a separate memory address for ancillary data embedded in the video signal, such as the vertical blanking interval based on the auxiliary active memory control signal 36. These separate addresses are shown as reference numeral 38.

The write FIFO 30 serves as write FIFO memory that receives the video, VBI data and audio data or other data from the uncompressed digital data stream 18. In addition, the write FIFO receives the separate memory addresses 38 associated with the VBI data, video data and auxiliary data from the memory address generator 28. The respective address and data for VBI data, video data and auxiliary data is stored in the write FIFO 30 and subsequently output in a first in, first out manner to the memory controller 32. The memory controller receives the video data, VBI data and auxiliary data from the write FIFO memory for output to the frame buffer 16. A graphics read FIFO 34 also receives graphics data where the single port capture circuit 10 is employed in a graphics controller chip for example. The memory controller 32 then receives the associated graphics data 40 for storage in a memory location frame buffer 16. Although not shown, a separate dedicated vertical blanking interval parser may also be used if desired so that the video parser 20 only parses video data from the input stream 18.

The frame buffer 16 is defined by a host processor or memory controller 32 to have separate storage locations for each of the video data, the VBI data, ancillary data (and audio data if present) based on memory address information 38. Also, the circuitry of FIG. 1 may be any suitable logic, microprocessor, micro controller, state machine, software, or any combination thereof.

Figure 2:
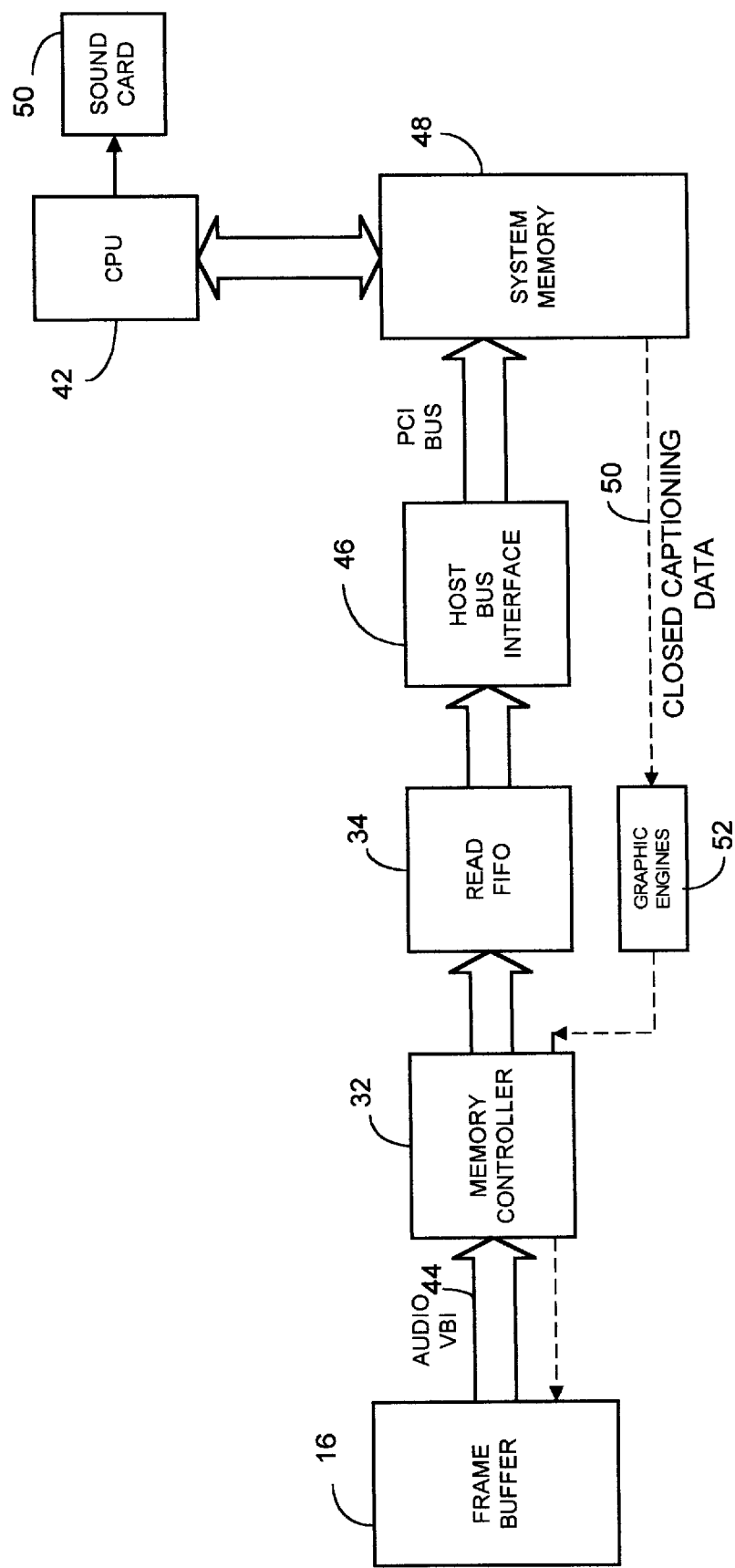
FIG. 2 is a block diagram generally illustrating host data transfer in accordance with one embodiment of the invention.

Referring to FIG. 2, a block diagram illustrates host data transfer to a host CPU 42 from frame buffer 16 through memory controller 32. The data in the frame buffer includes audio data that was embedded in the horizontal blanking interval. The read FIFO 34 obtains the data from the frame buffer. Host bus interface logic 46 provides a timing interface with a PCI bus, or other suitable host bus to system memory 48 to suitably store any data that CPU 42 wishes to read from the frame buffer 16. In the instance where the information is audio data stored for example as auxiliary data, a sound card 50 may ultimately receive the audio data from the CPU and subsequently output the audio to speakers. Where the host processor 42 analyzes VBI data such as closed-caption data, the system may decode closed-caption data stored in system memory (indicated at 50) and provide it to a suitable graphic engine 52 on the graphics controller. The graphics engine after processing the closed-caption data for suitable display may provide the data to the memory controller 32 and subsequently to the frame buffer 16 for display on a display device.

Figure 3:
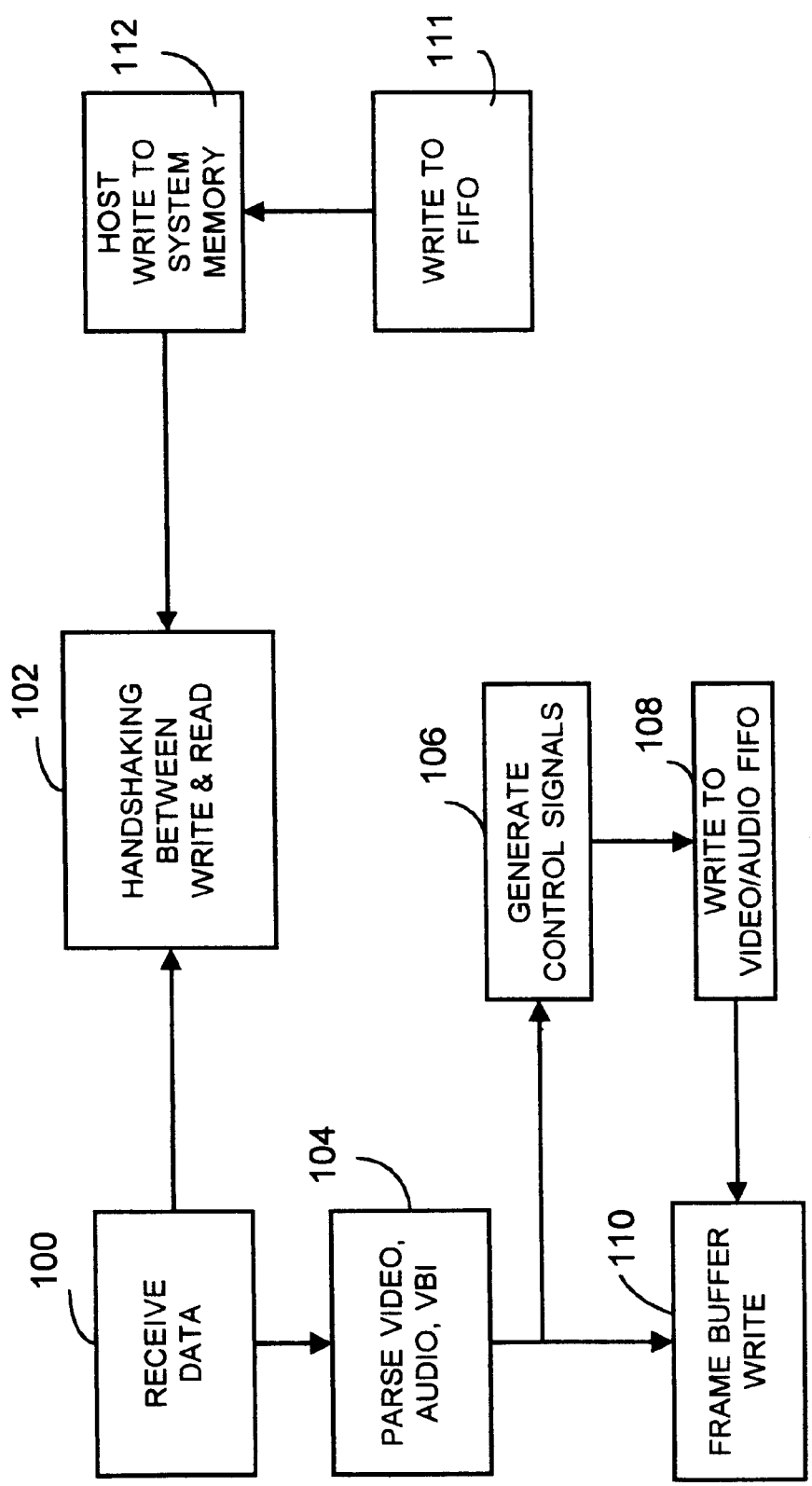
FIG. 3 is a flowchart illustrating the operation of the system shown in FIGS. 1 and 2.

Referring to FIG. 3, the method for writing data is shown. As shown in block 100, the capture circuit receives the uncompressed digital information. Handshaking is performed between the host CPU and the capture circuit as shown in block 102 to indicate whether a read or write is occurring. For example, double buffering may be used such as circular buffers so that when the capture circuit writes to one section of the frame buffer, the host can read another section of the frame buffer. A suitable interrupt scheme may be used so that when the writing operation to the frame buffer is complete, an interrupt is generated to let the host processor know that the frame buffer is full so that it may transfer or read data from the frame buffer.

As shown in block 104, the system parses video data, audio data and VBI data which may contain for example auxiliary data. As shown in block 106, the system generates the requisite memory control signals that facilitate the writing of requisite data to the write FIFO such as a video FIFO memory or audio FIFO memory as shown in block 108. As shown in block 110, the data is subsequently written from the write FIFO to the frame buffer in a defined separate location so that audio data, VBI data and video data is separated in the frame buffer. When the host wishes to read from the frame buffer, the memory controller writes data to a read FIFO as shown in block 111. The host then writes the data from the read FIFO to system memory as shown in block 112. The host may then decode data obtained from the frame buffer such as closed-caption data or may perform any other suitable operations and subsequently write data back into the frame buffer, as known in the art.

As a result, the above described invention provides a single port capture circuit and method that allows complete detection and processing of ancillary data to accommodate additional information that may be sent from the video signal. The above system employs a single port design on a common chip. A more precise synchronization with all of the video and audio data occurs due to the centralized control of all data. As one component, the cost can be reduced and the reliability may be improved.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A single port digital video and/or audio capture circuit responsive to digitized uncompressed digital video data and/or audio data and vertical blanking interval (VBI) data comprising:

at least one parsing circuit operative to parse received VBI data from at least one of: video data and audio data, and to generate a VBI memory control signal and at least one of: a video memory control signal and an audio memory control signal; and a memory address generator operatively responsive to the memory control signals that generates at least a separate memory address for VBI data based on the VBI memory control signal and a separate memory address for video data based on the video memory control signal.

2. The circuit of claim 1 wherein the at least one parsing circuit includes a separate parser of for video data and VBI data.

3. The circuit of claim 1 comprising:

at least one write FIFO memory operatively coupled to receive at least the video data, the VBI data, video memory address data and VBI memory address data; and at least one memory controller operatively coupled to receive video data and VBI data stored in the write FIFO memory for output to a frame buffer.

4. The circuit of claim 1 wherein the VBI data is received by the parser in ANC format.

5. The circuit of claim 1 wherein the at least one parser includes a dedicated VBI parser operative to parse VBI data.

6. The circuit of claim 1 including at least one frame buffer, operatively responsive to the memory control signals, defined to have separate storage locations for each of video and/or audio data and VBI data, based on the video memory address data and VBI memory address data.

7. A single port digital video and/or audio capture circuit responsive to digitized uncompressed digital video data and/or audio data and vertical blanking interval (VBI) data comprising:

at least one parsing circuit operative to parse received VBI data from at least one of: video data and audio data, and to generate a VBI memory control signal and at least one of: a video memory control signal and an audio memory control signal;

at least one frame buffer, operatively responsive to the memory control signals, defined to have separate storage locations for each of video and/or audio data and VBI data, based on the memory control signals;

at least one memory address generator, operatively responsive to the memory control signals, that generates at least a separate memory address for VBI data based on the VBI memory control signal and a separate memory address for video data based on the video memory control signal;

at least one write FIFO memory operatively coupled to receive at least the video data, the VBI data, video memory address data and VBI memory address data; and at least one memory controller operatively coupled to receive video data and VBI data stored in the write FIFO memory for output to the frame buffer.

8. The circuit of claim 7 wherein the at least one parsing circuit includes a separate parser of for video data and VBI data.

9. The circuit of claim 7 wherein the VBI data is received by the parser in ANC format.

10. The circuit of claim 7 wherein the at least one parser includes a dedicated VBI parser operative to parse VBI data.

11. A method for digital video and/or audio capture comprising the steps of:

employing a single port digital video and/or audio capture circuit that is responsive to digitized uncompressed digital video data and/or audio data and vertical blanking interval (VBI) data including the steps of: parsing received VBI data and at least one of: video data and audio data; and generating a VBI memory control signal and at least one of: a video memory control signal and an audio memory control signal to facilitate selective storage of VBI data and video data in a frame buffer.

12. The method of claim 11 including generating at least a separate memory address for VBI data based on the VBI memory control signal and a separate memory address for video data based on the video memory control signal.

13. The method of claim 11 comprising the steps of:

receiving, by at least one write FIFO memory, at least the video data, the VBI data, video memory address data and VBI memory address data; and receiving, by a memory controller, video data and VBI data stored in the write FIFO memory for output to the frame buffer.

14. The method of claim 13 including receiving the VBI data, prior to parsing, in ANC format.

15. The method of claim 11 including the step of defining the frame buffer to have separate storage locations for each of video and/or audio data and VBI data, based on the memory control signals.

* * * * *